United States Patent [19]

Bonaventura et al.

[11] Patent Number: 4,629,544
[45] Date of Patent: Dec. 16, 1986

[54] APPARATUS AND METHOD FOR REVERSIBLY REMOVING LIGANDS FROM CARRIERS

[75] Inventors: Joseph Bonaventura; Celia Bonaventura, both of Beaufort; C. William Anderson, Durham, all of N.C.

[73] Assignee: Aquanautics Corporation, San Francisco, Calif.

[21] Appl. No.: 653,729

[22] Filed: Sep. 24, 1984

[51] Int. Cl.⁴ ............................................. C25B 1/02
[52] U.S. Cl. ................................. 204/131; 204/129; 204/130; 204/263; 204/265; 204/266; 204/DIG. 4
[58] Field of Search ......... 204/130, 131, 129, DIG. 4, 204/240–244, 263, 265–266

[56] References Cited

U.S. PATENT DOCUMENTS

| | | | |
|---|---|---|---|
| 3,526,578 | 9/1970 | Silverman | 204/130 |
| 4,217,191 | 8/1980 | Doniat et al. | 204/222 |
| 4,299,673 | 11/1981 | Broniewski | 204/DIG. 4 |
| 4,475,994 | 10/1984 | Gagne et al. | 204/129 |

Primary Examiner—R. L. Andrews
Attorney, Agent, or Firm—Oblon, Fisher, Spivak, McClelland & Maier

[57] ABSTRACT

A method for reversibly removing a ligand from a ligand carrier, which comprises:

(1) contacting a fluid containing a binding-state ligand carrier to which said ligand is bound with a first electrochemical electrode wherein said binding-state ligand carrier undergoes a redox reaction to form a nonbinding-state ligand carrier and free ligand;

(2) removing free ligand from the fluid obtained in step (1);

(3) contacting the fluid obtained from step (2) containing said nonbinding-state ligand carrier with a second electrochemical electrode wherein said nonbinding-state ligand carrier undergoes a redox reaction to reform said binding-state ligand carrier;

(4) contacting the fluid obtained from step (3) containing said binding-state ligand carrier with a ligand source, whereby said ligand binds to said binding-state ligand carrier; and (5) repeating steps (1)–(4), is disclosed along with an apparatus useful in conducting this invention.

19 Claims, 11 Drawing Figures

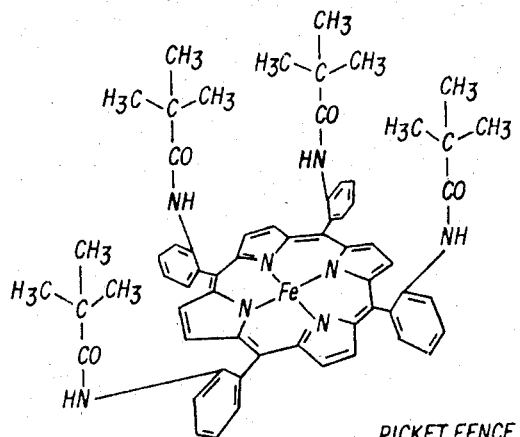
FIG. 7A PICKET FENCE PORPHYRIN SHOWN WITH IRON IN CENTER
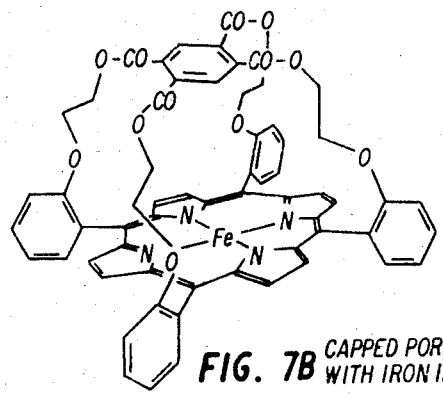
FIG. 7B CAPPED PORPHYRIN WITH IRON IN CENTER

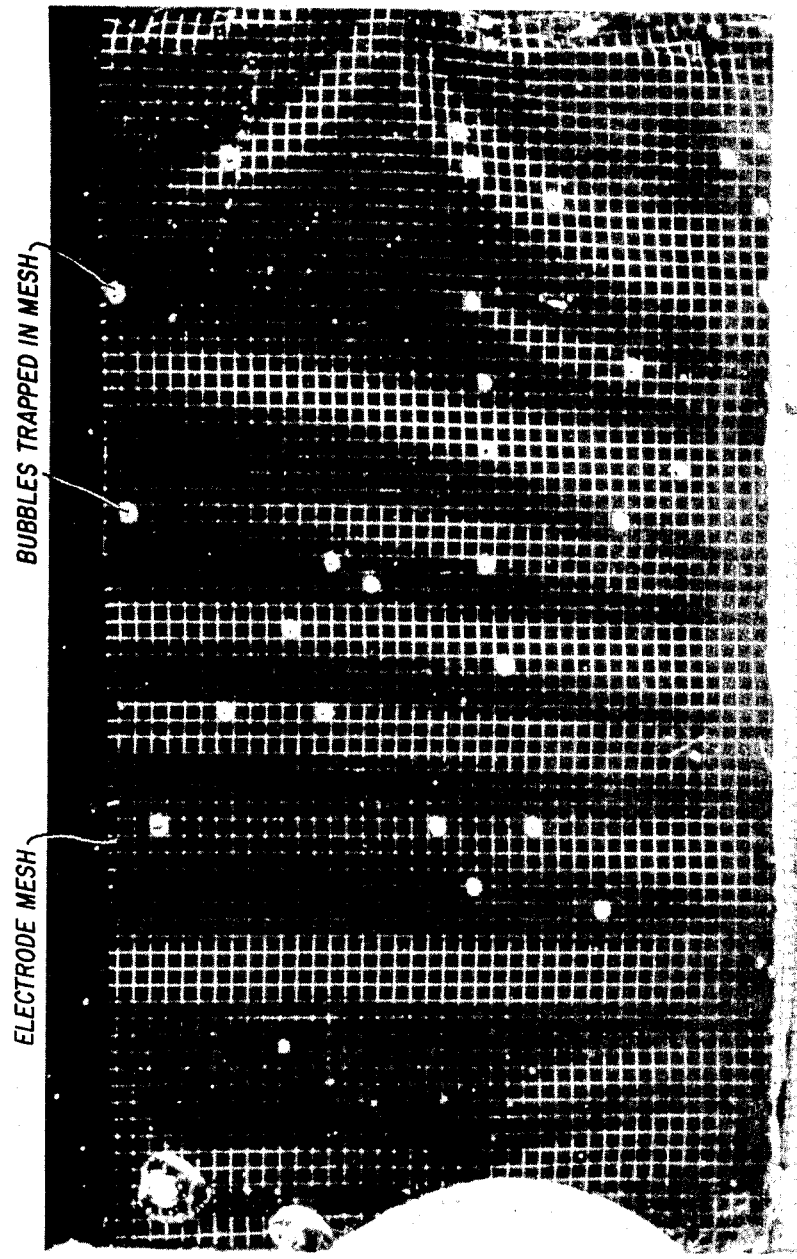
FIG. 9  BUBBLES PRODUCED BY OXIDIZING THE CARRIER SYSTEM. Fe (CAPPED) PORPHYRIN IN DMSO/1-Me-IMIDAZOLE

APPARATUS AND METHOD FOR REVERSIBLY REMOVING LIGANDS FROM CARRIERS

BACKGROUND OF THE INVENTION

1. Field of the Invention:

This invention relates to an apparatus and a method for removing a ligand from a ligand carrier in fluids and is particularly directed to the reversible removal of oxygen from oxygen carriers in which oxygen is bound to a cobalt or iron ion.

2. Description of the Prior Art:

Many molecules are bound to carriers when they are transported in a biological system. The properties of hemoglobins, hemerythrins and hemocyanins, the naturally occurring oxygen carriers, have been the subject of numerous studies, as documented in Bonaventura et al, J. Am. Zool., 20, 7 (1980) and 20, 131 (1980). In addition to oxygen, these carrier macromolecules also bind carbon monoxide, nitric oxide, hydroxide, cyanide, azide, fluoride, acetate, and formate, among other ligands. Artificial oxygen carriers and their properties in solution are described by a number of researchers. Traylor et al, "Solvent Effects on Reversible Formation and Oxidative Stability of Heme-Oxygen Complexes", *J.A.C.S.* 96, 5597 (1974) discloses the effect of solvent polarity on oxygenation of several heme-base complexes prepared by reduction with sodium dithionite or a mixture of Pd black and calcium hydride. Crumbliss et al, "Monomeric Cobalt-Oxygen Complexes", *Science*, 6, June 1969, Volume 164, pp. 1168–1170, discloses Schiff base complexes of Co(II) which form stable cobalt-oxygen species in solution instead of cobalt-oxygen-cobalt bridged complexes. Crumbless et al, "Monomeric Oxygen Adducts of N,N'-Ethylenebis (acetylacetoniminato) ligand-cobalt(III): Preparation and Properties", *J.A.C.S.* 92, 55 (1970), discloses a series of monomeric molecular oxygen carriers based on cobalt ligand complexes. Dufour et al, "Reaction of Indoles with Molecular Oxygen Catalyzed by Metalloporphyrins", *Journal of Molecular Catalysis*, 1, 277 (1980), discloses the catalysis of the oxygenation of simple, alkyl-substituted indoles by Co(II), Co(III), and Mn(III) meso-tetraphenyl-porphines wherein a ternary complex $O_2$-CoTPP-indole is formed initially. Brault et al, "Ferrous Porphyrins in Organic Solvents: I. Preparation and Coordinating Properties", *Biochemistry*, 13, 4591 (1974), discloses the preparation and properties of ferrous deutereporphyrin dimethyl ester and ferrous mesotetraphenylporphine in various organic solvents. Chang et al, "Kinetics of Reversible Oxygenation of Pyrroheme-N-[3-(1-imidazolyl)propyl]amide" discloses studies on the oxygenation of pyrroheme-N-[3-(1-imidazolyl)propyl]amide, i.e., a synthesized section of the myoglobin active site. Castro, "Hexa and Pentacoordinate Iron Poryhyrins", *Bioinorganic Chemistry*, 4, 45–65 (1974), discloses the direct synthesis of hexa and pentacoordinate iron porphyrins, i.e., the prosthetic groups for the active sites of certain cytochrome and globin heme proteins. Chang et al, "Solution Behavior of a Synthetic Myoglobin Active Site", *J.A.C.S.*, 95, 5810 (1973), discloses studies on a synthesized section of the myoglobin active site and indicates that the oxygen binding reaction does not require the protein. Naturally occurring oxygen carriers have been chemically cross-linked and their properties described. Bonsen et al, U.S. Pat. No. 4,053,590, discloses a polymerized, cross-linked, stromal-free, hemoglobin proposed to be useful as a blood substitute. Morris et al, U.S. Pat. No. 4,061,736, discloses intramolecularly cross-linked, stromal-free hemoglobin. Wong, U.S. Pat. No. 4,064,118, discloses a blood substitute or extender prepared by coupling hemoglobin with a polysaccharide material. Mazur, U.S. Pat. No. 3,925,344, discloses a plasma protein substitute, i.e., an intramolecular, cross-linked hemoglobin composition. However, crosslinked hemoglobin produces macromolecular complexes that retain many of hemoglobin's native properties.

However, little attention has been given to suitable means for reversibly removing the oxygen or other ligand from the carrier once it has become bound thereto. U.S. Pat. No. 4,343,715 describes several methods by which unloading of previously known oxygen carriers can be accomplished. When the oxygen carrier is a porphin-containing compound having a $Co^{2+}$ or $Fe^{2+}$ ion bound in the porphin ring, a chemical alteration which oxidizes the metal ion to the $3+$ state is able to release of the bound oxygen. For example, ferricyanide oxidation of hemoglubin to the ferric state, called in the literature methemoglobin, is a chemical means for unloading the absorbed oxygen. In this and other chemical methods it is necessary to use a regeneration cycle to reactivate the oxygen carrier. With hemoglobin, dithionite can be used to reduce the active sites and render the molecules reactive toward oxygen once again. Such chemical methods are disadvantageous for several reasons. First, they require continuous supplies of both chemical oxidizing solutions and chemical reducing solutions if a continuous oxygen extraction is taking place. Second, direct contact between the chemical and the working fluid which is extracting oxygen is required. This results in contamination of the working fluid by the oxidizing and reducing solutions and generally requires some type of separation before the working fluid can be used again. Third, if oxidizing or reducing solutions are prepared in ready-to-use form, they take up great bulk because of the fluid required and are accordingly not suitable for use in a portable apparatus which is designed for continuous operation over a long period of time.

Hemoglobins derived from fish hemoglobins can be unloaded based on the pH sensitivity of specific fish hemoglobins. Irreversible binding of specific cofactors to normal human blood can also render human hemoglobin pH sensitive so that pH changes can lead to oxygen unloading with this system as well. However, this method has the same disadvantages as chemical oxidation and reduction since solutions of the correct pH must be maintained.

Because of the disadvantages of chemical treatment, other unloading processes have also been disclosed. Simply decreasing the oxygen pressure in the environment of the oxygen carrier has been proposed for oxygen unloading. If desired, unloading can be effected indirectly through a semipermeable membrane. In this case, fluid containing an oxygen carrier to which oxygen is bound is passed on one side of a membrane while a pump on the other side of the membrane is utilized to draw a vacuum and pull the oxygen out of the circulating fluid and across the semipermeable membrane into an oxygen storage chamber. Unfortunately, removal of oxygen from carriers by vacuum suffers from some disadvantages. In laboratory tests, only somewhat more than 50% of the loaded oxygen on insolubilized hemoglobin in polyurethane gels was found to be removed by a vacuum. Furthermore, if the oxygen unloading device is used under water, it becomes increasingly more difficult to draw a vacuum and to support the evacuated chamber against the increase of pressure from the outside environment with increasing depth.

For these and other reasons, alternate methods of removing oxygen and other ligands bound to carriers are still needed.

SUMMARY OF THE INVENTION

Accordingly, one object of the invention is to provide an apparatus which will reversibly remove oxygen bound to carriers without requiring the use of chemicals or a vacuum.

It is a further object of the invention to provide a method of reversibly removing oxygen from a carrier which does not require a significant fraction of the energy which can be generated by using the oxygen so released in a fuel cell or combustion engine.

These and other objects of the invention as will hereinafter become more readily apparent have been accomplished by providing a method for reversibly removing a ligand from a ligand carrier, which comprises: (1) contacting a fluid containing a binding-state ligand carrier to which said ligand is bound with a first electrochemical electrode wherein the binding-state ligand carrier is modified by a redox process to a nonbinding-state ligand carrier and free ligand, (2) removing free ligand from the fluid obtained in step (1), (3) contacting the fluid obtained in step (2) containing the non-binding state ligand carrier with a second electrochemical electrode wherein the non-binding state ligand carrier is modified by a redox process to reform the binding-state ligand carrier, (4) contacting the fluid obtained in step (3) containing the binding-state oxygen carrier with a ligand source whereby said ligand binds to said binding-state ligand carrier. Steps (1)–(4) may optionally be repeated.

The invention also provides a ligand unloading apparatus, which comprises an electrochemical cell including a first electrode compartment having an inlet and an outlet and a second electrode compartment of opposite polarity to said first electrode having an inlet and an outlet; and a container having an interior space defined at least in part by a ligand permeable membrane, said container having an inlet and an outlet in communication with said interior space, said container inlet in communication with said first electrode compartment outlet and said container outlet in communication with said second electrode compartment inlet, said container adapted such that a fluid passing from said first electrode compartment enters said container, is transported past said ligand permeable membrane, exits said container, and enters said second electrode compartment.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 7A shows a picket fence porphyrin with iron in the center. .

FIG. 7B shows a capped porphyrin with iron in the center.

FIG. 9 shows a bubbles produced by oxidizing the carrier system.

DETAILED DESCRIPTION OF THE PREFERRED EMBODIMENTS

Figure 1:
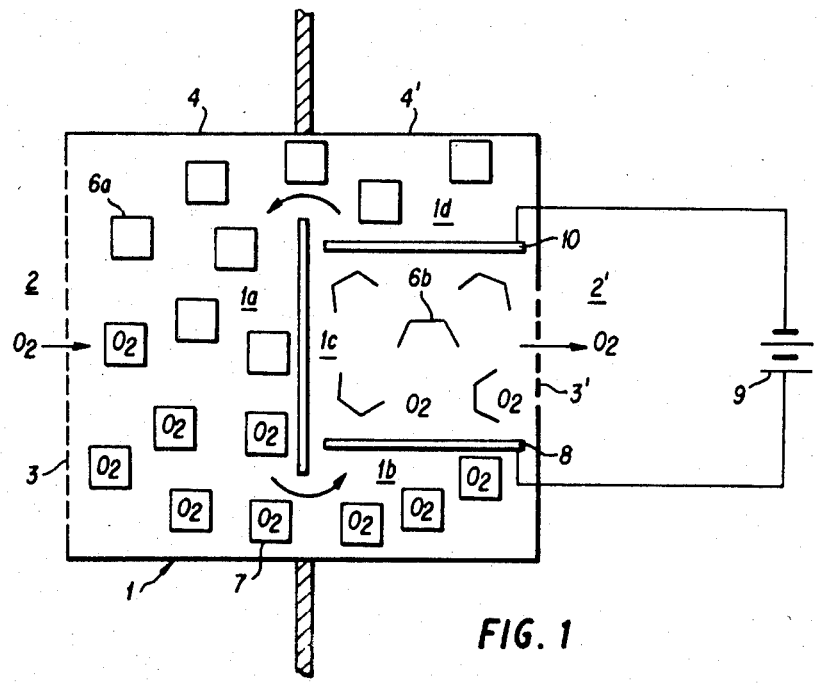
FIG. 1 is a schematic diagram showing the practice of the method of the invention.

Although electrochemical measurements of the voltages required to oxidize and reduce certain natural molecules such as hemoglobin had been made prior to the present invention, there is no teaching in the prior art regarding electrochemical oxidation as a method of reversibly removing oxygen (or any other ligand) from a carrier molecule in a system designed to extract the ligand from one environment and produce a higher concentration of the ligand in another location for use in the production of useful work. Careful attention must be given the energetics of such systems, especially if oxygen is produced by the extraction apparatus and the oxygen is to be removed in sufficient quantities to provide energy to drive the system and to produce extra energy which can be used for useful work. The present inventors have discovered that certain oxygen carriers as well as carriers of other ligands can be reversibly cycled through a series of oxidation/reduction steps with low energy costs. This method is not usable with all ligand carriers but only those which have a first oxidation state capable of binding the ligand and a different oxidation state in which the ligand cannot bind to the carrier or is bound with less affinity. Both such cases are referred to as a "nonbinding-state" in this specification for simplicity. Such compounds are generally although not necessarily based on metal ions which reversibly cycle through lower and higher oxidation states. Carriers containing transition metal ions, especially iron and cobalt, are accordingly particularly useful in the practice of the present invention.

It will be readily recognized by those skilled in the art that a carrier molecule designed to bind one particular molecule in a biological system (or a synethetically produced carrier molecule) can often bind other molecules as well. For example, hemoglobin and other biologically derived oxygen-binding compounds can bind many ligands in addition to oxygen. For example, carbon monoxide, nitric oxide, oxygen, isocyanide, and nitroso-aromatics all bind to the reduced form of hemoglobin ($Fe^{2+}$). Hydroxide, cyanide, azide, fluoride, nitric oxide, acetate, and formate all bind to the oxidized form of hemoglobin ($Fe^{3+}$). Thus, although one often refers to hemoglobin and similar molecules as oxygen carriers, they are more correctly referred to a ligand carriers. Furthermore, the present invention does not rely on the presence of the ligand itself but on the ability of the carrier to be oxidized and reduced reversibly. Accordingly, any reference in this specification to a "oxygen carrier" or to a carrier as being a carrier of any particular ligand is not intended to specify that no other ligands can be carried by the same carrier molecule.

Carriers which can be used in the practice of the invention often comprise a metal ion chelated to nitrogens of a cyclic tetradentate molecule. Such compounds typically have a tetraminotetra(trimethylene) structure forming at least part of the basic molecule. This can be represented by the formula

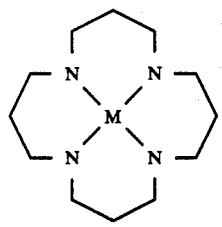

in which M represents the metal ion. Organic substituents can be present at any of the methylene carbons as long as they do not destroy the planarity of the metal binding nitrogens. Additionally, one or more non-cumulative double bonds can be present at any location where a single bond is now shown.

Two axial positions remain free in such molecules and are available to bind oxygen or another ligand. In proteinaceous oxygen carriers such as hemoglobin, the metal bining molecule is protected by the peptide chains which interact with the metal binding molecule and usually provide a nitrogenous ligand for one of the axial positions. However, in the absence of some additional chelating group to perform the same protective function as the proteinaceous portion of hemoglobin, the metal ion will be oxidized to a non-binding form, especially in aqueous systems. Accordingly it is necessary to provide a nitrogenous base to chelate with one side of the metal ion so that oxidation can be prevented if a non-proteinaceous carrier of oxygen is used. This can be symbolized as follows:

in which —M— represents a side view of the essentialy flat tetradentate chelating molecule and

N represents a nitrogenous base, whose various possible structures are discussed later in detail. This consideration is not relevant to as great an extent when the ligand being carried is not oxygen.

Many non-proteinaceous compounds which are useful in carrying out the present invention contain a porphin ring, a metal ion chelated in the ring, and a nitrogenous base chelated to the metal ion in at least one of the two possible axial positions not occupied by the porphine nitrogens. Porphin itself is a tetrapyrrole having the following structure:

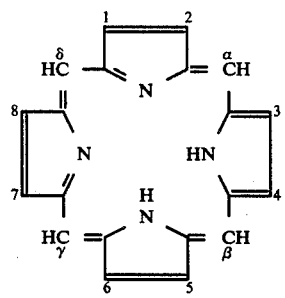

The porphin ring occurs widely in nature, particularly in compounds known as porphyrins. For example, porphyrins appear in hemoglobin, myoglobin, peroxidase, catalase, and at least 5 different cytochromes (b, c, $c_1$, a, and $a_3$). The porphyrins are well known and are named according to the side-chain substituents which are found on the pyrrole rings of the base compound. Examples of known classes of porphyrins include coproporphyrins, etioporphyrins, mesoporphyrins, and protoporphyrins. The most abundant of these in nature are the protoporphyrins. Protoporphyrins contain 2 propionic acid groups, 4 methyl groups, and 2 vinyl groups. Fifteen different isomeric forms exist, depending on the sequence of substitution. The structure of the most abundant form, protoporphyrin(IX) (found in hemoglobin, myoglobin, and most of the cytochromes), is shown below.

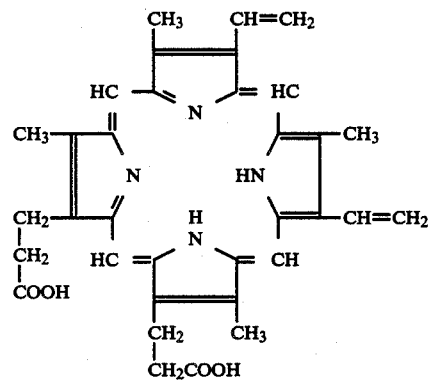

In addition to the naturally occurring porphyrin-containing molecules, synthetic porphyrin-like derivatives are also known. Several such compounds are disclosed in the prior art references previously cited. Derivatives are commonly formed by reacting one of the propionic acid side chains with a molecule that contains an amino or hydroxyl group in order to form an amide or ester link, respectively. The carboxylic acid side chains of the porphyrins also provides a convenient method of attaching these molecules to a solid support, as will be discussed later. However, functionalization of any porphyrin ring system is generally readily achieved by an organic chemist because of the reactive pyrrole rings. Thus, the number of porphyrin molecules that can be synthesized by a competent organic chemist is practically unlimited. Of these many compounds, those which are suitable for use in the present invention can be readily determined by their ability to bind ligand. Ligand binding is readily determined by ultraviolet spectroscopy for most ligands as is well known to those skilled in the art. (See, for example, Brinigar et al, J.A.C.S. 96, 5597 (1974).) Porphyrin molecules which are capable of forming an oxygen complex without greater than 50% oxidation after 1 hour under 0.2 atmosphere of oxygen are preferred for use in the practice of the present invention.

Preferred porphyrin-containing compounds include porphyrins and alkyl esters of porphyrins, particularly those containing 1–4 carbon atoms per ester-forming alcohol. Also preferred are porphyrin derivatives in which a nitrogenous base is attached to a porphyrin through a carboxylic acid side chain. Such molecules have the formula PCO—X—$(CH_2)_y$—Z where the PCO-portion of the molecule is derived from a porphyrin having a carboxylic acid group of the formula PCOOH, X represents NH or O, y is 2–5, and Z represents a 5- or 6- membered aromatic, saturated, or ethylinically unsaturated ring containing one or two nitrogen atoms.

Protoporphyrins are particularly preferred porphyrin ring-containing structures and protoporphyrin(IX) is most preferred.

In addition to the porphyrin or similar ring, the oxygen-binding porphyrin-derived compound must contain a metal ion capable of binding oxygen when chelated in the ring. Typical metal ions include iron, manganese, zinc, nickel, cobalt, and copper. Iron or cobalt in the $+2$ oxidation state is preferred. When $Fe^{2+}$ is present in a protoporphyrin ring system, the resulting complex is called protoheme, or more simply heme.

The final component of the non-proteinaceous binding compound used with this invention (especially when used to carry oxygen) is a nitrogenous base chelated to the metal ion in one of the axial positions that remain after the porphyrin or other ring itself has formed a square-planer complex with the central metal ion. Preferred nitrogenous bases include 5- and 6-membered aromatic, saturated, and ethylinically unsaturated rings containing 1 or 2 nitrogen atoms in the ring. These compounds may be substituted by one or more, preferably one, organic substituent, preferably an alkyl group (most preferably having 1–4 carbon atoms) or an alkyl group which is itself substituted with a hydroxyl or amino group. As discussed above, compounds in which one of these nitrogen-containing rings is colvalently bound to the porphyrin ring through a carboxylic acid side-chain on the porphyrin ring are also preferred. Free (i.e., non-covalently bound) nitrogenous bases which are preferred are those in which all hydrogens on electronegative atoms have been replaced by one or more of the substituents named above in this paragraph. Imidazole and pyrrolidine derivatives having a $C_1$–$C_4$ alkyl group substituent on the N-1 are particularly preferred, with 1-methyl imidazole being most preferred.

The nitrogenous base may be present when the oxygen binding compound is added to the carrier fluid or the nitrogenous base may be present in the carrier fluid itself. In fact, a preferred embodiment of the present invention utilizes the nitrogenous base itself as the carrier fluid when oxygen is the ligand. However, other organic solvents such as hydrocarbons, chlorinated hydrocarbons, dimethylformamide, alcohols, and the like, can also be used as the carrier fluid. Mixed solvent systems are also suitable. Examples of non-nitrogenous solvent systems include toluene, methylene chloride, mixed solvents containing methylene chloride and methanol, hexafluoroethylene, and the like. Aqueous solutions are also suitable, although it is essential that a nitrogenous base be selected which is capable of strongly chelating to the metal ion in order to prevent oxidation of the essential metal ion when oxygen or another ligand capable of oxidizing the carrier to a nonbinding state is present. Such bases can readily be selected from bases described herein using the spectrophotometric technique previously discussed which readily reveals both oxidation and complex formation. Nitrogenous bases which are covalently attached to the porphin ring as described above are preferred with aqueous systems.

Carriers which are not miscible in water offer some advantages when oxygen or another ligand is being extracted from water or an aqueous solution, such as seawater. Membranes with relatively large pores may be used to promote rapid ligand transfer across the membrane since the two liquids will tend to stay s parate and not mix in the pores. However, large pressure differences between the two surfaces of the membrane should be avoided under these circumstances to avoid forced mixing of the liquids.

Binding compounds (carriers) of the invention may be free in solution or may be attached to a solid support material which is capable of circulating with the carrier fluid. For example, a carboxylate group on a porphyrin molecule may be reacted, either directly or through a divalent linking molecule, with a hydroxyl or amino group of a circulating particle, such as a finely divided polymer. Typically, a linking molecule of the formula A-L-B will be used, where A is a group capable of reacting with a functional group in the oxygen binding compound (preferably a hydroxyl or amino group when the oxygen binding compound contains a carboxylate), L is any covalently linked sequence of atoms which joins A to B and preferably comprises —$CH_2$— or para-phenylene groups or a mixture thereof which provide a separation of 5 to 50 angstroms between A and B, and B is a functional group capable of forming a bond (preferably but not necessarily a covalent bond) with the circulating particle. Examples of L include —$(CH_2)_n$— wherein n is from 1 to 20 and —$(CH_2)_n$— wherein n is from 1 to 20 and

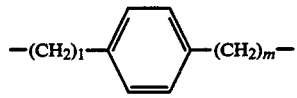

wherein l and m independently represent an integer from 0 to 10. B may be an amino, hydroxyl, carboxylate or other organic functional group of moderate reactivity, a functional group capable of forming a highly reactive organic functional group such as a carbene or nitrene (for example, nitrene precursors include azides from which nitrenes can be generated by photolysis), or even non-reactive portions of a molecule such as a large alkyl or aromatic hydrocarbon portion which binds tightly to a non-polar surface by hydrophobic interactions.

The circulating particle is not limited by its chemical structure as long as binding capacity (easily measured as described above) is retained for the binding compound when it is attached to the circulating particle. Circulating particles can be prepared by grinding from solid polymers, glass, or other solid substrates, preferably to average diameters of 5–10μ. Circulating particles as described in U.S. Pat. No. 4,427,416 can readily be adapted to the practice of the present invention by replacing the hemoglobin described therein with one or more of the present non-proteinaceous oxygen binding compounds. Of course, it is also possible to attach hemoglobin or any of the other proteinaceous carriers discussed in the following section to circulating particles in the same manner as described above.

In addition to the non-proteinaceous carriers described above, proteinaceous carriers can also be used with the method and apparatus of the present invention.

Hemoglobin is, of course, by far the most common oxygen carrying protein found in nature. Within this context, however, it is possible to use in commercial applications any of the hemoglobins which are available in large quanity, e.g., human, bovine, procine and equine hemoglobins. Further, whole blood, lysed cells, stripped or unstripped hemolysates can be used. Modified forms of hemoglobin, i.e., high or low affinity hemoglobins, as known in the art, are also useful. Hemoglobin can be treated to manipulate its affinity. Covalent or chemical modification, prior to immobilization, or treatment of the hemoglobin with cofactors that bind tightly and alter oxygen binding affinity (these are removable by washing the polymeric matrix with appropriate buffers) can be used. Additives, like catalase, superoxide dismutase and methemoglobin reductase, can be added to the carrier solutions. These agents are normally found in red blood cells and can be useful in conferring structural and functional stability to the hemoglobin. Additionally, reagents such as glycerol, which are known to impart structural stability to proteins in solution, can be usefully added to the solution.

Although hemoglobin is by far the most common oxygen carrier found in nature, other types of oxygen carriers are found in a number of species. In particular hemocyanins and hemerythrins are known and usable although they suffer from the deficiency of being unavailable in large quantities.

The use of synthetic ligand carriers, such as the modified hemes and other like compounds known in the art, which show reversible oxygen binding, allow the attainment of high oxygen (and other ligand) absorbing capacity in minimum absorber volume. Several such carriers are discussed in the section of this application entitled Description of the Prior Art.

Hemoglobin and other oxygen carriers are described in more detail in U.S. Pat. No. 4,343,715, along with methods of preparing these oxygen carriers and of insolubilizing them in various ways, should insolubilization be desired.

Surprisingly, it has been found that the method of this invention can be conducted with molecules like hemoglobin in which the heme portion of the molecule is isolated from contact with the electrode by the protein which surrounds the heme. Nonetheless, hemoglobin and related molecules can readily be reduced and oxidized using the method and apparatus as described herein.

The individual components of the apparatus used in the practice of the method of the invention are readily available to those skilled in the art although certain combinations of these components have not been previously known. For example, the electrochemical reactions themselves can be conducted in any electrochemical cell which has an anode compartment and a cathode compartment through which the appropriate fluids can be transported. Considerable effort has gone into the design of electrochemical cells useful for conducting continuous chemical reactions, for example, cells used in the electrolysis of salt solutions to produce chlorine and sodium hydroxide. Although such cells do not represent preferred embodiments of the present invention, they can readily be adapted for use in the practice in the present invention. For example, the electrolytic cells disclosed in British Patent No. 2,009,795 and U.S. Pat. Nos. 4,210,501, 4,214,958, and 4,217,401 can be adapted for use in the practice in the present invention when the ligand in its free form is a gas by arranging for the carrier fluid to pass into the first electrode chamber where the carrier is modified and the ligand is released (this chamber already being adapted for the collection of gas since chlorine is normally produced in this chamber) and then into the second electrode chamber where the nonbinding-state oxygen carrier r is modified to reform the binding state ligand carrier Which is again capable of binding the ligand. Of course, it is readily recognized that the first electrode chamber can be either an anode or cathode chamber depending on the direction of the redox reaction needed to release the ligand.

However, such electrochemical apparatuses are not readily useable in those preferred embodiments of the present invention which involve unloading of oxygen in undersea applications where the carrier fluid is under high pressure as a result of contact with seawater at depths of 10 meters or more. Under these conditions, it is preferred that the carrier fluid containing the oxygen binding compound be enclosed within a sealed system and that all oxygen transfers occur through ligand permeable membranes. Such an apparatus is also readily adapted to use with nonvolatile ligands which cannot be collected as a gas.

Typically, an apparatus used for the extraction of oxygen from seawater will comprise an oxygen loading station, such as that described in cofiled patent application Ser. No. 653,850, titled "System for the Extraction and Utilization of Oxygen from Fluids", in which an oxygen binding compound is transported past an oxygen permeable membrane in contact with the environment from which oxygen is being extracted. For purposes of illustration, a reduced state oxygen binding compound, such as hemoglobin, is presumed to act as the carrier. A carrier fluid containing the oxygen binding compound is then transported to an apparatus of the present invention through a conducting system which seals the carrier fluid from both the external seawater environment and the internal environment of the chamber into which oxygen is being released. The reduced state oxygen carrier is oxidized at the anode of an electrochemical cell, and the carrier fluid containing free dissolved or gaseous oxygen is transported to a separate location where the oxygen passes into the interior environment in which it will be consumed through an oxygen permeable membrane. This is the membrane which is present in certain preferred apparatus of the present invention. The carrier fluid containing the oxidized state oxygen carrier is then circulated back through a cathode compartment of an electrochemical cell where the reduced state oxygen carrier is reformed by electrochemical reduction. The carrier fluid containing the reduced state oxygen carrier is then transported back to the oxygen loading station, after which the entire operation can be repeated.

One component of an apparatus of the present invention is a ligand permeable membrane. However, the technology relating to the production and use of ligand permeable membranes is well known and need not be set forth here in detail. See, for example, "Membrane Technology", Kirk-Othmer *Encylcopedia of Chemical Technology,* 3rd Edition, John Wiley and Sons, New York, Volume 15, pages 92–131, and the references cited therein. Certain preferred embodiments of suitable membranes are discussed here, however, in order to exemplify the invention.

The selection of a membrane for use in the present invention is not limited other than by the ability of the membrane to pass the ligand while retarding the passage of other components of the fluid environment from which the ligand is being extracted. It will be desirable to select a membrane based on the purpose for which it will be used, e.g., use in contact with exhaust gas or extraction of a ligand from a waste liquid stream. Most important synthetic membranes are formed from organic polymers, and there are extensive tabulations of permeability coefficients for various ligand/polymer systems now in existence. See, for example, van Amerongen, Rubber Chem. Technol. 37, 1065 (1964); Allen et al, J. Member. Sci. 2,153 (1977); Yasuda et al in Brandrup et al Eds., Polymer Handbook, Second Edition, John Wiley and Sons, New York, 1975, p. 111; and Bixlar et al in Sweeting, Ed., the Science and Technology of Polymer Films, Vol. II, John Wiley and Sons, New York, 1971, p. 85. In addition to ligand permeability, inertness to the external fluid environment and the internal carrier fluid are also required. Such properties of polymers are also well known.

The physical microstructure of the membrane is not important so long as the membrane performs the function described herein. Accordingly, dense films, porous membranes, and asymmetric and composite membranes are suitable. The macroscopic form of the membrane is also relatively unimportant although hollow fibers are preferred over flat sheets or tubular membrane configurations since hollow fibers are self-supporting and thus eliminate the need for expensive support materials. In fact, hollow fiber cartridges in which a plurality of gas permeable hollow fibers are connected in parallel between two manifolds at opposite ends of each tube can readily be adapted for use in the present invention. For example, Romicon manufactures a hollow fiber cartridge 3 inches in diameter and 43 inches long containing 660 hollow fibers joined to manifolds at opposite ends of the cartridge. The hollow fibers have a surface area of 2.5 $m^2$ and volume of 647 ml and are in the form of a composite membrane with a silicone rubber layer over a polysulfone layer. When used to release oxygen, for example, the cartridge walls form an oxygen-collecting chamber around the hollow fibers through which the carrier fluid is transported.

Although, as indicated previously, the design of the electrode and cathode compartments of the electrochemical cell are not critical to the practice of this invention, certain embodiments are preferred. For example, a parallel plate electrochemical cell in which anode and cathode compartments alternate in order to reduce the volume occupied is a preferred embodiment. In order to maximize contact of the carrier fluid containing the oxygen binding compound with the anode and cathode, it is preferred that the anode and cathode compartments have a thickness of no more than 5 millimeters, preferably no more than 1 millimeter. Particularly preferred are porous electrodes, such as vitreous carbon or polytetrafluoroethylene covered with a thin layer of an inert metal such as gold or platinum. The carrier fluid in such an embodiment passes through the porous electrodes, the spaces of which form the anode and cathode compartments.

The electrochemical cell compartments will contain an inlet and outlet in each anode and cathode compartment through which fluid can be conducted. Of course, one skilled in the art will recognize that anode and cathode compartments can be changed merely by reversing the electrical leads. The present example is illustrated by assuming that the first electrode compartment in an anode compartment and that an oxygen carrier which binds oxygen in the reduced state is being used. A container is attached by means of a conduit to the outlet of the anode compartment. The conduit may be a separate tube or may be formed entirely or in part from the walls of the container or the anode compartment. Since oxidation takes place in the anode compartment, the anode compartment when in operation will contain the carrier in the oxidized state and free oxygen in solution. When the free oxygen in solution passes through the conduit into the container, it is removed through an oxygen permeable membrane which forms at least one surface of the container. Since all oxygen is released by the electrochemical oxidation of the carrier, an extremely high concentration of oxygen can exist in the carrier fluid. Accordingly, a positive gradient across the gas permeable membrane will exist even if air is present on the opposite side of the membrane. It is only necessary that the partial pressure of oxygen be lower in the chamber where oxygen is being collected for use than it is in the fluid inside the container. This is the meaning of "low partial pressure" of the ligand as used in this application in reference to the environment in which the ligand is being released.

The fluid is then transported through a second conduit attached to the container so that fluid which enters the container from the anode compartment contacts the membrane prior to exiting the container through the second conduit. This second conduit is attached to an inlet in the cathode compartment and can be formed in the same manner as the first conduit described above. The cathode compartment also contains an outlet through which the fluid passes on its way to pick up oxygen from the environment.

To continue the illustration of releasing oxygen, since oxygen is generally being produced for consumption, it is relatively easy to maintain a low partial pressure of oxygen on the gas-collecting side of the container membrane. If this oxygen is consumed by a human, animal, or fuel burning engine, the result is the same: reduction of the partial pressure of oxygen on the oxygen consuming side of the membrane, which maintains the pressure gradient and the high rate of oxygen removal from the system.

Of course, it is possible to consume the oxygen without isolating the oxygen in gaseous form. Oxygen in the carrier fluid may be transported to a fuel cell where the oxygen is consumed directly. In a preferred embodiment of the invention, the anode compartment is itself part of the energy generating fuel cell as well as being a place where oxygen is released from the carrier so that no transportation is required.

When a ligand other than oxygen is being collected at the unloading station, other means of maintaining a low ligand partial pressure (or concentration when the ligand is nonvolatile and is being extracted into a liquid phase) will be required. Generally, some chemical reaction which converts the ligand to a source not free to migrate back into the carrier fluid will be used, or the ligand will be transported away from the membrane by physical means. Chemical reactions for removing ligands (e.g., NO in a waste stream) are already known. The present invention offers advantages over direct contact of a waste stream with these chemical reactants. If the ligand being removed from a waste stream is present only in small quantities, it is possible to concentrate the ligand by utilizing the binding affinity of the ligand carrier and to release the ligand in high concentration for ready reaction with the ultimate removing chemical. The method of the invention also provides a method for readily concentrating minute quantities of material which are to be removed by physical transport; e.g., trapping as a compressed gas or concentrated solution for later disposal.

The invention will now be described with reference to certain preferred embodiments shown in the FIGURES.

FIG. 1 shows in schematic form the operation of an idealized apparatus of the present invention in combination with an oxygen loading device of unspecified character. Oxygen is presumed to be the ligand in this illustration. The essential characteristics of the apparatus of the invention include a container 1 which communicates with the environment 2 into which oxygen is to be transported by means of a gas permeable membrane 3. The remaining portion of the container walls 4 in the embodiment shown is impermeable to gas, but in other embodiment is not so limited. Within the confines of container 1 is a fluid 5 which contains oxygen binding compound 6. For purposes of illustration, the binding state is shown as a reduced oxidation state. In the oxygen loading device 9, oxygen becomes bound to oxygen carrier 6a (the reduced from of compound 6) to form a bound-oxygen complex 7. Complex 7 is transported along with fluid 5 through conduit 8 to container 1 where oxygen is unloaded (dissociated) from the oxygen carrier to which it is bound by oxidation of the reduced state oxygen carrier 6a to the oxidized state oxygen carrier 6b at anode 12 to produce free oxygen and free oxygen carriers 6b. The oxygen is removed from the oxygen unloading carrier, in the embodiment shown by diffusion through gas permeable membrane 3. The fluid 5 containing the free oxygen carrier 6b is then circulated past cathode 13 where oxidized state oxygen carrier 6b is reduced to reduced state oxygen carrier 6a. Carrier fluid 5 containing reduced carrier 6a is then circulated through conduit 11 back to container 9 where the process is repeated.

Figure 2:
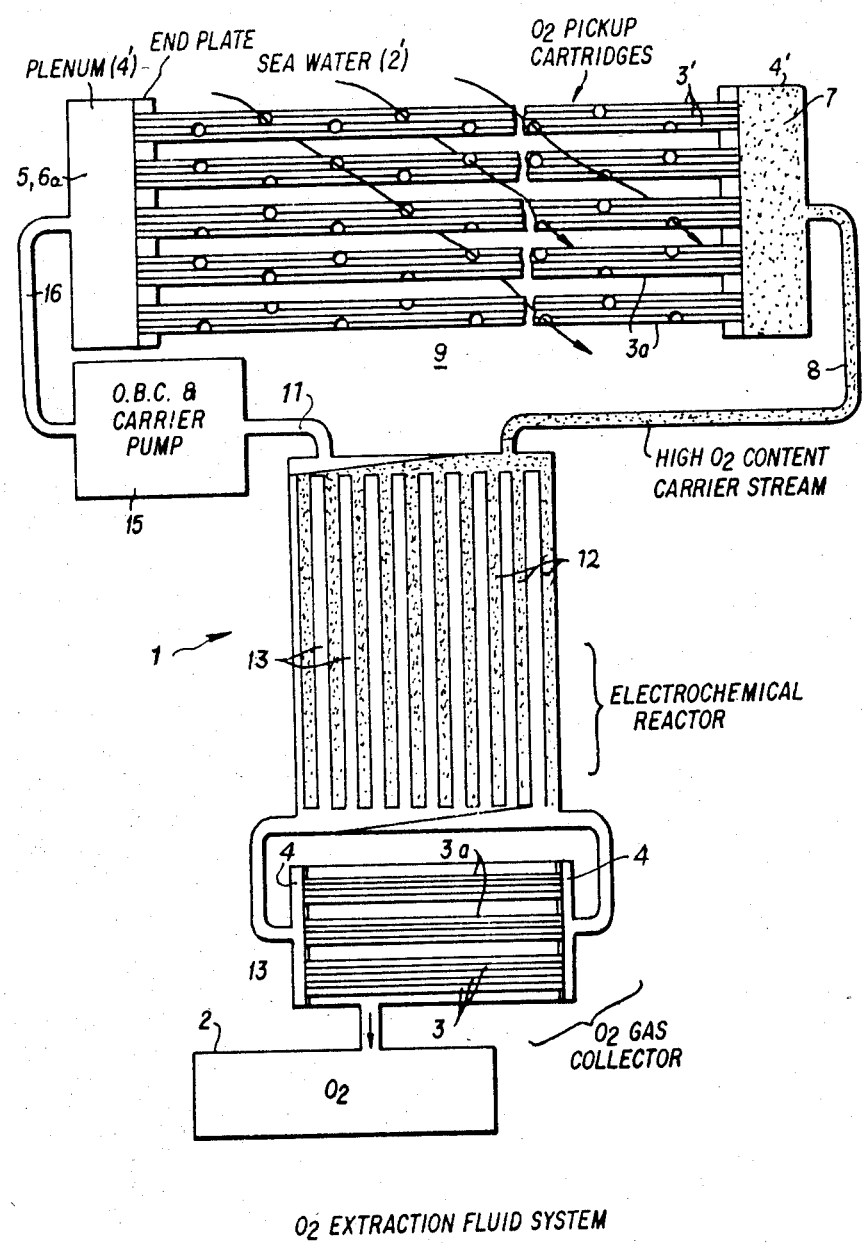
FIG. 2 is a schematic diagram of a preferred embodiment of the apparatus of the invention.

FIG. 2 shows a schematic diagram of a particularly preferred embodiment of the invention using a hollow fiber cartridge 9 as an oxygen loading station, an electrochemical unloading system 1, and a free oxygen collection space 14 where extracted oxygen is obtained as a gas. The hollow fiber cartridge forms container 9 in which oxygen permeable membrane 3' consists of bundles of hollow fibers. Seawater from the external environment (2') is flowed around the hollow fibers while carrier fluid 5 containing oxygen binding compound (OBC) 6a (not shown) passes through the interior of the hollow fibers. The oxygen binding compound binds oxygen from seawater to form a complex 7 which is isolated from the seawater environment by the gas impermeable plenum 4' into which one end of each hollow fiber is inserted. Complex 7 is transported through conduit 8 to an electrochemical reactor 1 where the oxygen carrier, in this preferred embodiment comprising a porphin ring containing a metal ion in the two plus oxidation state, is oxidized at anode 12 and releases the oxygen into carrier 5. Free oxygen in the carrier 5 then passes through a gas collector which in this preferred embodiment consists of a smaller hollow fiber cartridge having gas impermeable plenum 4 leading to hollow fiber bundles 3a where free oxygen in carrier fluid 5 passes through gas permeable membrane 3 into gas collecting space 14 which is in contact with the interior environment 2 into which oxygen is being released. Carrier fluid 5 containing oxygen binding compound 6b (not shown) in its oxidized form is then passed back through the electrochemical reactor where reduction takes place at cathode 13, making the oxygen binding compound ready to bind oxygen again. Carrier fluid 5 is then transported by means of a pump 15 through conduit 11 back to the oxygen loading station (hollow fiber cartridge 9) where the process is repeated.

Figure 3:
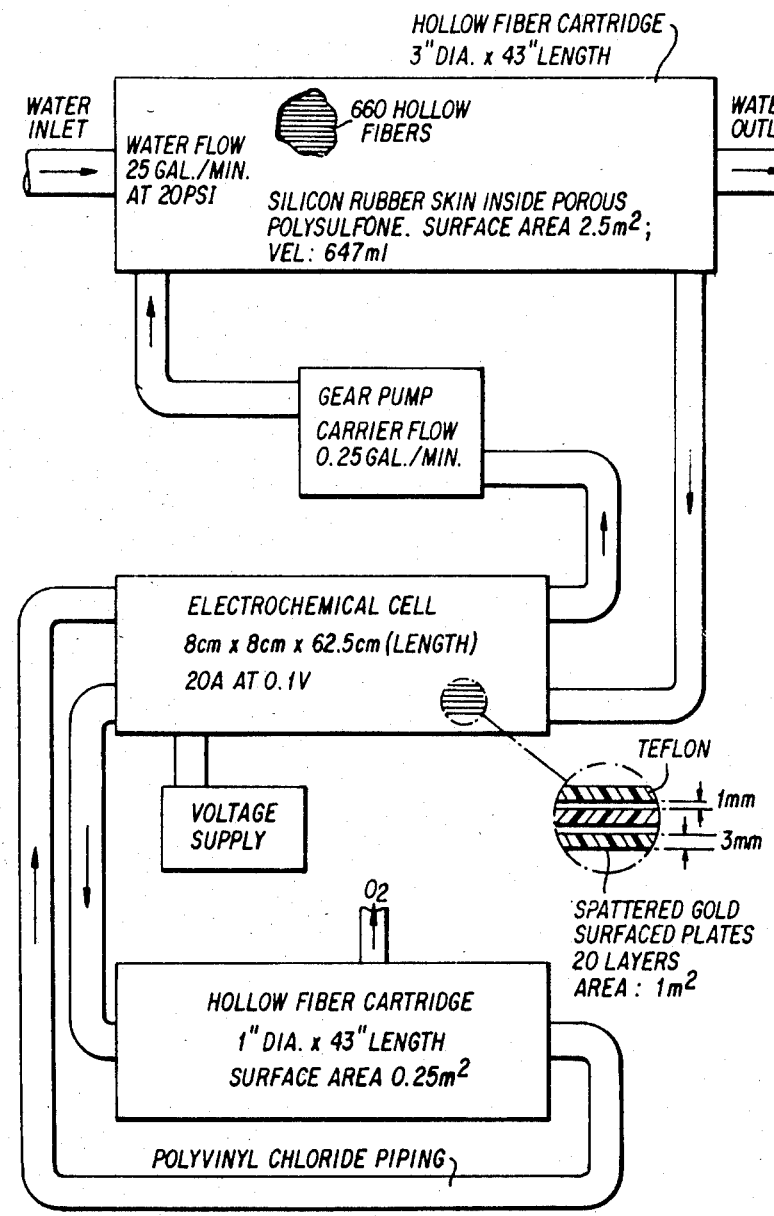
FIG. 3 is a schematic diagram of a preferred embodiment of the apparatus of the invention showing manufacturing parameters.

FIG. 3 shows a schematic diagram of a working electrochemical cell and unloading station in combination with a pump for circulating the carrier and a ligand extraction station. The two components together form a sealed system containing a fixed volume of ligand carrier and carrier fluid. The electrochemical cell comprises twenty parallel teflon plates having sputtered gold surface. The plates are 3 mm thick and spaced at a distance of 1 mm. An individual plate is 62.5 cm long and 8 cm wide. When stacked in a parallel plate arrangement, the twenty layers have a total height of 8 cm. The electrochemical cell is connected to a voltage supply capable of providing 20 amps at 0.1 volt. The unloading station comprises a hollow fiber cartridge 1 inch in diameter and 43 inches in length containing hollow fibers which consist of porous polysulfone with an interior silicon rubber skin. The surface area of the hollow fibers is 0.25 $m^2$. Polyvinylchloride piping is used to connect various inlets and outlet ports. The outlet port of the first electrode compartment is connected to the inlet port of the hollow fiber cartridge so that fluid which exits from the first electrode compartment enters the interior of the hollow fibers. The outlet port of the hollow fiber cartridge is connected to the inlet port of the second electrode compartment. The inlet port of the first electrode compartment is connected to the outlet port of the ligand extracting station while the outlet port of the second electrode compartment is connected through a pump to the inlet port of the ligand extracting station. In the embodiment shown the ligand extracting station comprises a hollow fiber cartridge 3 inches in diameter and 43 inches in length. The cartridge contains 660 hollow fibers made of porous polysulfone with an interior silicon rubber skin. The hollow fibers have a membrane surface area of 2.5 $m^2$ and an interior volume of 646 ml. The space surrounding the hollow fibers is in communication with the electrochemical cell, not the interior of the hollow fibers. A fluid containing the ligand which is being extracted passes through the interior of the hollow fibers.

Operation of the apparatus is illustrated with heme as the ligand carrier and 1-methylimidazole as the carrier fluid. Approximately 1 liter of carrier fluid is present in the interior volume of the apparatus of the invention and the ligand extracting station together. Carrier fluid containing the ligand carrier having a ligand bound thereto passes from the exit port of the ligand extracting station into the inlet port of the first electrode compartment where a redox reaction takes place (an oxidation when heme is carrying oxygen) in order to release the ligand from the ligand carrier. Free ligand, carrier fluid, and nonbinding-state ligand carrier pass from the exit port of the first electrode chamber into the ligand unloading station where ligand passes through the walls of the ligand-permeable membrane and is collected. In the particular illustration shown, oxygen passes directly into the space where it is being utilized. It is also possible to pass fluids or chemical reactants over the outside of the hollow fibers as has been previously discussed. It will of course be recognized that the ligand can be concentrated or diluted depending on the rate at which the carrier fluid is circulated. Slow circulation results in high concentrations of the ligand bound to the ligand carrier and thus released at the first electrode compartment. Carrier fluid (now depleted of ligand) and non-binding-state ligand carrier pass from the exit port of the ligand unloading station to the inlet port of the second electrode compartment where an electrochemical reaction opposite to that which occurred in the first electrode compartment takes place. This second redox reaction reforms the original binding-state ligand carrier. Binding-state ligand carrier and carrier fluid then pass from the exit port of the electrochemical cell through a gear pump to the inlet port of the ligand extracting station. In the embodiment shown which is used to extract oxygen from water and release oxygen into a second environment, water flows through the ligand (oxygen) extracting hollow fiber cartridge at a rate of 20 gallons per minute at 20 psi pressure. Circulating heme (20 mM) and 1-methylimidazole circulates at 0.25 gallons per minute.

The apparatus and method of the invention can be used in any application where it is desirable to remove oxygen from one location and concentrate it in a second location. For example, there are many applications in which the oxygen is present as a contaminant in a fluid, and removal of oxygen therefrom is desired. For example, oxygen degrades food products such as beer, wine, and orange juice, and removal of oxygen from these fluids greatly enhances the shelf storage life of the commodity.

In other applications, it is desirable to increase the concentration of oxygen above that which is present in a given environment. For example, persons afflicted with lung disorders who require a high concentration of oxygen for ease of breathing are now mostly limited to bottled oxygen, and movement of such persons is accordingly severely restricted. Miners also need higher oxygen levels than are available under some mining conditions. Recently, some portable units for producing oxygen-enriched air for medical uses have been marketed (Passwater et al, Am. Lab. 3,21 (1971)). An oxygen extractor of the type described herein can readily replace these units which rely on membranes alone to provide oxygen-enriched air. In fact, the process of the present invention provides a viable alternative to the liquification and distillation processes by which oxygen is now generally obtained from air.

Oxygen may also be extracted from water using the apparatus and method of the invention. Typical applications include supplying oxygen to free-swimming divers, to divers in submersible vehicles, to fuel cells which operate under water, and to various energy consuming engines which require oxygen for combustion processes.

In all of these applications, electrochemical unloading and recycling of oxygen carriers provides an energy efficient means for utilizing oxygen carriers dissolved or suspended in carrier fluids. Calculations indicate that two square meters of electrode surface are sufficient to both oxidize and reduce oxygen carriers which are described herein (particularly the preferred heme/1-methylimidazole carrier) at a rate sufficient to supply oxygen to a 10 Kw internal combustion engine. The electrodes could be packed into two liters of space in the form of reticulated vitreous carbon. It is estimated that less than 10% of the energy that could be produced from the oxygen released by such a system would be required to run the redox systems in both directions. Calculations showing the electrical energy required for both unloading the ligand and reforming the binding-state ligand are shown below.

Electrochemical Loading/Unloading Calculations:

(1) Loading will be preceded by a reduction of the carrier.
(2) Unloading will be preceded by an oxidation of the carrier, lowering its affinity for $O_2$.
(3) The difference in potential required between the anode (oxid) and cathode (red) is found from:

$E_{tot} = E_{thermodynamic} + E_{iR}$ (Joulean) $+ E_{kinetic\ overpotential}$ $E_{thermodynamic}$ = Potential determined by the Nernst relationship:

$$E_{sol} = E^{0'} - \frac{RT}{nF} \ln \frac{R}{O}$$

Assume 50% load/unload cycle. The R/O ratio must change from 3:1 to 1:3
R = 1.987 cal/M °K.
T = 298° K.
$E_a = E° + 0.028$ V
F = 23,060 cal/Volt
$E_c = E° - 0.028$ V
$E_{thermo} = E_a - E_c = 56$ mV
$E_{iR}$ = Potential determined by solution resistance and current requirements
R = Specific resistance * electrode separation/ area
= 9.7 ohm-cm 0.1 cm/1.0 cm$^2$ = 0.97 ohm (in a 1 cm$^2$ area)
i = 10 mA/cm$^2$ (this value will be determined largely by mass transfer properties of the cell—flow rates, ultrasonics, etc.—but this is a value roughly 0.05 of that used by fuel cells and other bulk electrolytic processes)
$E_{iR}$ = 0.010 A*0.97 ohm = 0.0097 V (9.7 mV)
$E_{kinetic\ overpotential}$ is very small. The exchange current and Heterogeneous electron transfer rate constant for heme in 1-methylimidazole at a gold electrode are very large. ($k_h°'$ = 1.57 × 10$^{31}$ $^1$ cm/sec) This term can be ignored.
$E_{tot}$ = 56 mV + 9.7 mV = 66 mV to be applied across the electrodes.
Power consumption for the load/unload cycle:

$$P = E * i$$
$$= 0.066\ V * 0.010\ A$$
$$= 0.00066\ \text{watts per cm}^2 \text{ of electrode surface ot}$$

-continued
produce $O_2$. This counts both the loading and unloading sides of the electrochemical process.

1.0 cm² of electrode surface area produces:

$$\frac{0.010 \text{ A}}{1.0 \text{ cm}^2} \times \frac{1.0 \text{ coul/sec}}{1.0 \text{ A}} \times \frac{1 \text{ mole } e^-}{96500 \text{ coul}} \times \frac{1 \text{ mole } O_2}{1 \text{ mole } e^-} \times \frac{22.4 \text{ l } O_2}{1 \text{ mole } O_2} \times \frac{60 \text{ sec}}{1 \text{ min}} = 0.00014 \frac{\text{l } O}{\text{min}^2}$$

Therefore, the power required to electrochemically modulate the carrier to transfer $O_2$ is: 4.7 watts per liter of $O_2$ per minute. Thus, even with less than 50% efficiency of the entire transfer, there will be no more than 10 watts $O_2$ per min required. It should be noted that since it is the oxygen carrier that is being changed, this same energy calculation will be valid for the removal of other ligands.

Detailed engineering studies have shown the validity of the present invention. One independent study stated unequivocally that the principle of electrochemical oxygen release as described above is technically feasible and has been demonstrated.

Figure 4:
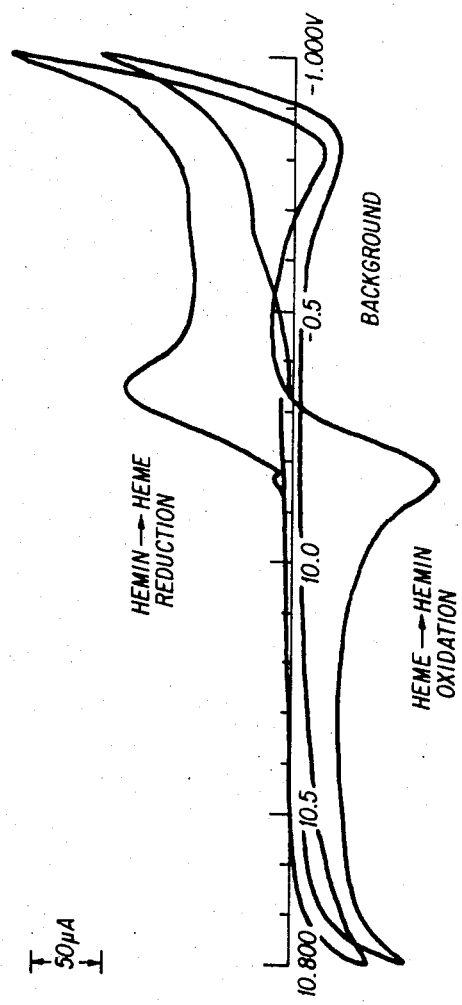
FIG. 4 is a graph of cyclic voltammetry of a ligand carrier demonstrating chemical reversibility of ligand binding and unloading operations under the influence of an electrochemical electrode.

Additional evidence demonstrating the feasibility of the present invention has been obtained through laboratory experiments. FIG. 4 shows cyclic voltammetry of hemin chloride and 1-methylimidazole, demonstrating chemical and near thermodynamic reversibility. The experimental conditions were as follows: initial and rest potential, −325 mV; high potential, 800 mV; low potential, −1,000 mV; sweep rate, 200 mV/sec; sweep segments, 3; intial sweep, negative.

Figure 5:
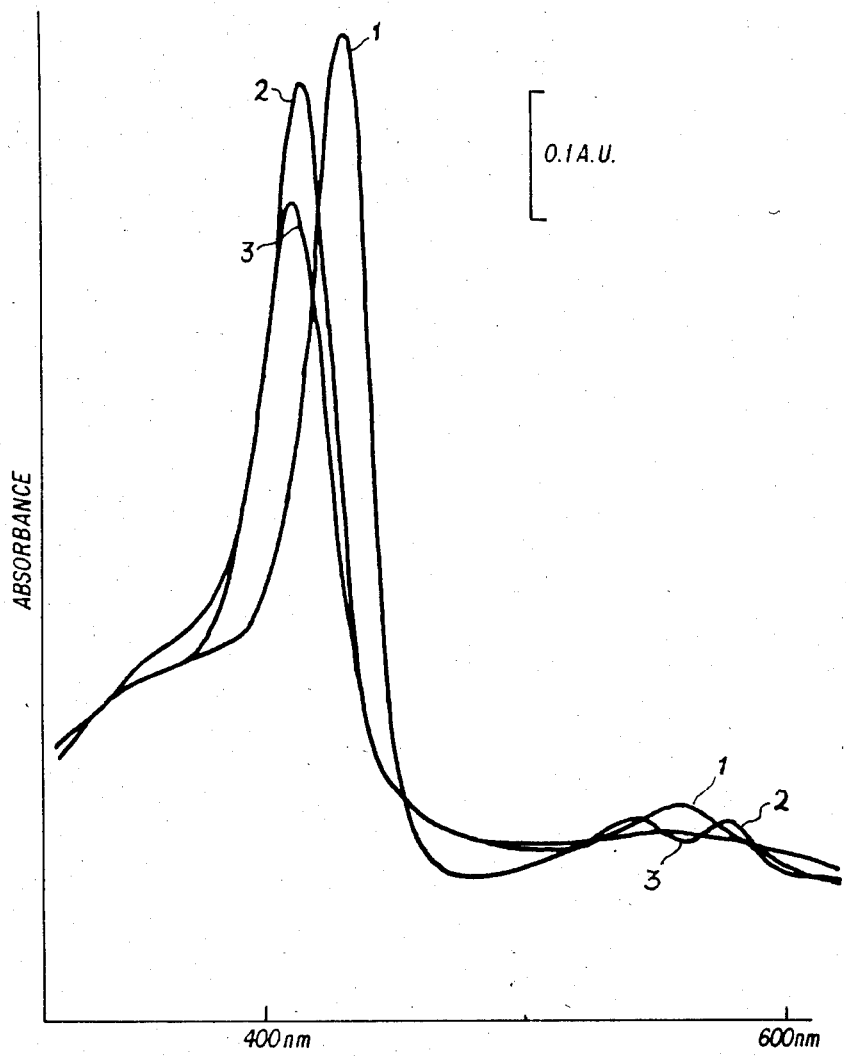
FIG. 5 is a graph showing spectra of different oxidation and binding states of a ligand carrier which can be used in the practice of the invention.

Additional evidence is seen in FIG. 5 which shows spectra of an electrochemically cycled oxygen carrier, in this case hemoglobin A. Spectrum 1 shows the reduced form of hemoglobin with oxygen bound thereto at a potential of −50 mV. Spectrum 2 shows electrochemically oxidized hemoglobin and indicates that the oxygen is no longer bound. This sectrum was measured at +600 mV. Spectrum 3 shows electro-chemically re-reduced hemoglobin after removal of oxygen from the solution. When oxygen was replaced in the solution, the process could be repeated and the same spectra were obtained, thereby indicating the reversibility of the process.

In these experiments, oxidation and reduction took place by direct electrode electron transfer, not a chemical oxidant-reductant reaction. Although such materials are not essential, it is also possible to carry out the redox reactions in the presence of a modifier/promoter, a linker, or a mediator. These terms have the usual meanings which they have in electrochemistry. A mediator is a small molecule capable of carrying a charge from the electrode surface to the carrier molecule in solution. A modifier/promoter is a chemical substance attached to the surface of an electrode which facilitates transfer of electrons to the carrier without undergoing a redox process itself. A linker is a molecule which is attached to the electrode surface and binds the carrier molecule, thereby facilitating contact between the carrier and the electrode surface.

It will be recognized by those skilled in the art that many ligand carriers operate in a manner different from the preferred embodiments that are described in detail. For example, hemerythrins contain two iron atoms joined by a chemical bind. When oxygen acts as a ligand, each oxygen of a dioxygen molecule binds to one of the irons. Hemocyanins are similar to hemerythrins at their binding site but have copper instead of iron. Nevertheless, these molecules are still preferred carriers in addition to the tetradentate molecules previously discussed in detail. As can be seen from these examples, it is evident that a central single metal ion is not an essential characteristic of a ligand carrier useful in the practice of the invention. This is likewise shown by the articles discussed in the section of this specification entitled DESCRIPTION OF THE PRIOR ART which show non-cyclic ligand carriers. As has been previously discussed, the essential characteristic of a ligand carrier useful in connection with the present invention is that it exhibit two reversibly interchangeable oxidation states which exhibit different binding affinities for the ligand being carried.

Figure 6:
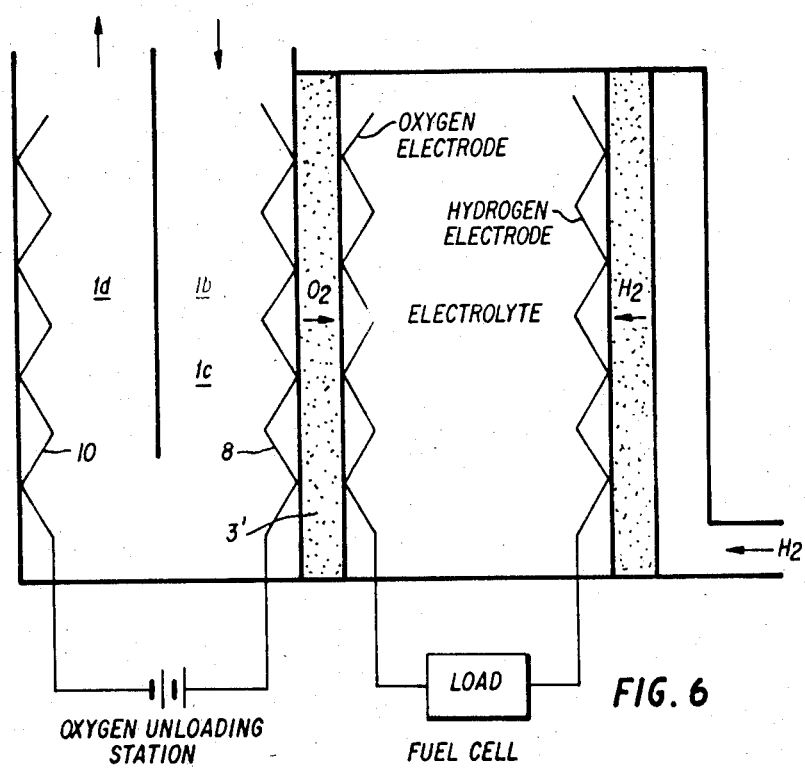
FIG. 6 is a schematic diagram of a preferred embodiment of the apparatus of the invention in combination with a fuel cell.

FIG. 6 shows a particularly preferred embodiment of an apparatus of the invention which comprises an electrochemical cell capable of unloading oxygen from an oxygen carrier and a fuel cell capable of utilizing the oxygen so removed for the production of power. In the embodiment shown, the left-hand portion of the figure shows two compartments of an electrochemical cell while the right-hand portion of the figure shows a fuel cell. In this illustration the binding state is presumed to be a lower oxidation state so that the oxygen-releasing reaction is a reaction taking place at an anode. Reference numbers in this illustration refer to the same species as in other figures. When this apparatus is in operation, bound-oxygen complex 7 (not shown) is transported along with carrier fluid 5 (not shown) into the first electrode compartment where it contacts anode 12. An electrochemical reaction takes place which produces free oxygen and non-binding state oxygen carriers (not shown). The free oxygen is transported across membrane 3, which is in contact with anode 12, to an oxygen electrode of the oxygen-consuming fuel cell. The oxygen electrode is in contact with the second side of membrane 3. In the embodiment shown, hydrogen diffuses into the fuel cell where it contacts a hydrogen electrode, and ions pass through electrolyte between the oxygen and hydrogen electrodes. The fuel cell is thus a standard oxygen-consuming fuel cell. Fuels other than hydrogen can be used at the second electrode. While oxygen migrates through membrane 3, fluid 5 and oxidized-state oxygen carrier 6b (not shown) are transported into the second electrode compartment where carrier 6b contacts cathode 13 and is reduced to reform reduced-state oxygen carrier 6a (not shown). Carrier fluid 5 then recirculates back to the oxygen loading station and the process is repeated. If desired, container wall 15 separating the first and second electrode compartments may be ion permeable in order to expedite ion transfer and reduce back voltage.

To date, three experiements have been conducted that indicate the electrochemical modulation of dioxygen carriers resulting in the binding and release of dioxygen. These experiments were conducted on two classes of systems: natural macromolecule carriers in aqueous media and synthetic "heme-type" carriers in non-aqueous media. These experiments have been summarized in the table that follows.

TABLE 3

| CARRIER | SOLVENT | ELECTROLYTE | ELECTRODE | DETECTION |
|---|---|---|---|---|
| Hemoglobin | water | Phosphate | Au,C,Pt | Spectral |
| Co(PFP) | DMSO/Me—Im | TEACl | Au(C) | visual |
| Fe(CapP) | DMSO/Me—Im | TEACl | Au(C) | visual |

Experiments with Hemoglobin

These experiments are as described above in reference to FIG. 5. Recent experiments included the presence of a mediator in the same solution (0.1 mM methylene blue) that facilitated the electron transfer to hemoglobin. This resulted in the reduction of the amount of energy necessary to cyclicly oxidize and reduce human hemoglobin from 30 Kcal/mole to 4 Kcal/mole. This simply makes the energetics of the process much more favorable.

Experiments with synthetic "heme-type" carriers

Two experiments have been carried out on these systems: one with a "picket fence" porphyrin containing Cobalt as the central metal ion (where the dioxygen binds) and one with a "capped" porphyrin containing Iron as the central metal ion. These two molecules are shown in FIG. 7A and 7B. The experimental procedure was identical in both cases, as was the sovlent, electrode material, supporting electrolyte, and cell geometry. The concentration of carriers was high enough to produce an amount of released oxygen that would cause supersaturation of the dioxygen in solution. The solvent/electrolyte system contained: 90% Dimethylsulfoxide, 10% 1-methyl-imidazole and 0.1 Molar tetraethylammonium chloride. The reference electrode used was Ag/AgCl.

Figure 8A:
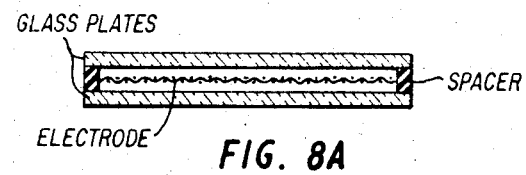
FIG. 8A is a diagram of a cell with the working electrode.

The cell is diagrammed in FIG. 8A. The working electrode (which behaves alternatively as either anode or cathode) is a gold transparent mesh sandwiched between two pieces of glass. This apparatus is placed in a "cup" FIG. 8B that holds the counter electrode and reference electrode as well as some solution to be examined. The solution of interest is drawn up to the working electrode where it can be both controlled by the application of potentials and currents as well as observed through the glass sides. This observation was both spectroscopic and visual. The system was subjected to cyclic voltammetry in order to determine the redox potential of the carrier as well as to determine the presence of other competing chemical reactions.

Figure 8B:
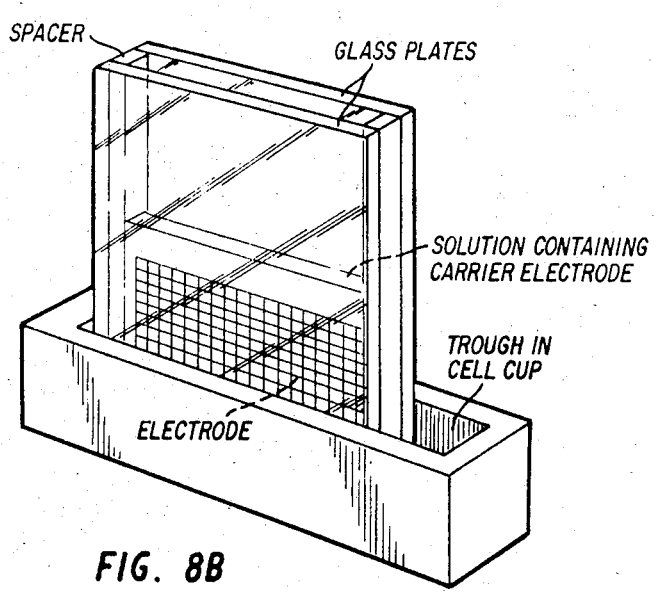
FIG. 8B shows the apparatus placed in A "cap".

After determining the redox potential (approx. 0.0 V vs Ag/AgCl for the Co-Picket fence porphyrin and +0.1 V vs Ag/AgCl for the Fe-capped porphyrin in these solutions), the solutions were set to a potential that ensured that the carrier was in the reduced, dioxygen binding form. This was −0.400 V vs Ag/AgCl. The solution was allowed to achieve equilibrium for three hours, and the spectra taken through the working electrode showed this to be the case. The solution containing the carrier was contacted with air, at this point, to allow the binding of dioxygen to the carrier. Several hours of contact with the atmosphere ensured the equilibrium binding. At this point, the carriers were stepwise oxidized by jumping the potential more positive at the working electrode. The time between steps was roughly 30 minutes and small potential steps were taken so the entire duration of the experiment was approximately twelve hours (within 15 minutes). At the end of the oxidative potential steps, the solution showed bubbles of released gas around the electrode. The bubbles were not present in any other portion of the apparatus. A photograph of oxygen bubbles is shown in FIG. 8B. The grid shown is the mesh electrode. While the only electrode material that was used in these particular experiments was gold, when these carriers were examined using cyclic voltammetry for their redox activity, both showed adequate rates of electron transfer to be useful in this process. As a result, it appears that carbon is also a suitable electrode material for use.

When the same experiment was conducted on a solution identical to those employed above—but not containing a carrier—no gas was extracted from the air and no bubbles were produced anywhere in the cell.

All publications and patents cited in this specification are intended to indicate the state of the art and the skill of those of ordinary skill in the art. All publications and patents cited in this specification are herein incorporated by reference.

The invention now being fully described, it will be apparent to one of ordinary skill in the art that many changes and modifications can be made thereto without departing from the spirit or scope of the invention set forth herein.

What is claimed as new and desired to be secured by Letters Patent of the United States is:

1. A method for reversibly removing a ligand from a ligand carrier, which comprises:
   (a) contacting a fluid containing a binding-state ligand carrier to which said ligand is bound with a first electrochemical electrode wherein said binding-state ligand carrier undergoes a redox reaction to form a nonbinding-state ligand carrier and free ligand;
   (b) removing free ligand from the fluid obtained in step (a);
   (c) contacting the fluid obtained from step (b) containing said nonbinding-state ligand carrier with a second electrochemical electrode wherein said nonbinding-state ligand carrier undergoes a redox reaction to reform said binding-state ligand carrier;
   (d) contacting the fluid obtained from step (c) containing said binding-state ligand carrier with a ligand source, whereby said ligand binds to said binding-state ligand carrier; and
   (e) repeating steps (a)-(d),
   wherein said first electrode and said second electrode comprise parallel plates of polytetrafluoroethylene or carbon covered with a thin layer of gold or platinum.

2. The method of claim 1 wherein said first and second electrode compartments have a thickness of no more than 5 mm.

3. The method of claim 1 wherein steps (a) and (c) are conducted in an electrochemical cell comprising a first electrode compartment having an inlet and an outlet and containing a first electrode maintained at said first electrochemical potential and a second electrode compartment having a inlet and an outlet and containing a second electrode maintained at said second electrochemical potential, wherein said electrochemical cell is attached to a container having an interior space defined at least in part by a ligand permeable membrane, said container having an inlet and an outlet in communication with said interior space, said container inlet in communication with said first electrode compartment outlet and said container outlet in communcation with said second electrode compartment inlet, said container adapted such that a fluid passing from said first electrode compartment enters into said container, is transported past said ligand permeable membrane, exit said container, and enters said second electrode compartment.

4. A method for reversibly removing oxygen from an oxygen carrier, which comprises:
   (a) contacting a fluid containing a binding-state oxygen carrier to which oxygen is bound with a first electrochemical electrode wherein said binding-state oxygen carrier undergoes a redox reaction to form a nonbinding-state oxygen carrier and free oxygne;
   (b) collecting free oxygen from said fluid through a gas permeable membrane into a region having a partial pressure of oxygen lower than the partial pressure of oxygen in said fluid;
   (c) contacting the fluid obtained from step (b) containing said nonbinding-state oxygen carrier with a second electrochemical electrode wherein said nonbinding-state oxygen carrier undergoes a redox reaction to reform said binding-state oxygen carrier;
   (d) contacting the fluid obtained from step (c) containing said binding-state oxygen carrier with an oxygen source, whereby oxygen binds to said binding-state oxygen carrier; and
   (e) repeating steps (a)-(d).

5. A method for reversibly removing a ligand from a ligand carrier, which comprises:
   (a) contacting a fluid containing a binding-state ligand carrier to which said ligand is bound with a first electrochemical electrode wherein said binding-state ligand carrier undergoes a redox reaction to form a nonbinding-state ligand carrier and free ligand;
   (b) removing free ligand from the fluid obtained in step (a);
   (c) contacting the fluid obtained from step (b) containing said nonbinding-state ligand carrier with a second electrochemical electrode wherein said nonbinding-state ligand carrier under goes a redox reaction to reform said binding-state ligand carrier;
   (d) contacting the fluid obtained from step (c) containing said binding-state ligand carrier with a ligand source, whereby said ligand binds to said binding-state ligand carrier; and
   (e) repeating steps (a)-(d);
   wherein said binding-state ligand carrier is hemoglobin, a hemocyanin, a hemerythrin, a synthetic heme, heme complexed with a nitrogenous base, a tetradentate non-heme organo-metallic compound, or a chemically modified hemoglobin or hemocyanin.

6. The method of claim 1 wherein said binding state ligand carrier comprises a $Co^{2+}$ or $Fe^{2+}$ ion chelated in a porphin-ring-containing compound and said nonbinding-state oxygen carrier comprises a $Co^{3+}$ or $Fe^{3+}$ ion, respectively, chelated in said compound.

7. The method of claim 6 wherein said compound comprises a protoporphyrin or an alkyl ester of a protoporphyrin.

8. The method of claim 6 wherein said compound comprises a non-proteinaceous compound containing a porphin ring and a nitrogenous base chelated to said $Co^{2+}$ or $Fe^{2+}$.

9. The method of claim 8 wherein said fluid is an organic solvent.

10. The method of claim 9 wherein said fluid and said nitrogenous base are the same.

11. The method of claim 10 wherein said nitrogenous base is 1-methylimidazole.

12. The method of claim 11 wherein said oxygen carrier is a heme/1-methylimidazole complex.

13. An oxygen unloading apparatus, which comprises:
   an electrochemical cell including a first electrode compartment having an inlet and an outlet and a second electrode compartment having an inlet and an outlet; and
   a container having an interior space defined at least in part by a ligand permeable membrane, said container having an inlet and an outlet in communication with said interior space, said container inlet in communication with said first electrode compartment outlet and said container outlet in communication with said second electrode compartment inlet, said container adapted such that a fluid passing from said first electrode compartment enters said container, is transported past said ligand permeable membrane, exits said container, and enters said second electrode compartment.

14. The apparatus of claim 13 wherein said ligand permeable membrane is an oxygen permeable membrane.

15. The apparatus of claim 14 wherein said oxygen permeable membrane is a composite membrane of a silicone rubber and a porous polysulfone.

16. The apparatus of claim 13 wherein said cell comprises:
   a plurality of parallel plate electrodes which form anode and cathode compartments therebetween, said parallel plate electrodes having a plate separation of no more than 5 mm.

17. An oxygen unloading apparatus, which comprises:
   an electrochemical cell having a first electrode compartment and a second electrode compartment wherein said first electrode compartment comprises an oxygen permeable membrane having a first surface facing the interior of said first electrode compartment and a second surface facing the interior of an oxygen-consuming fuel cell.

18. The apparatus of claim 17, wherein a first electrode of said electrochemical cell contacts said first surface of said membrane and an oxygen-consuming electrode of said oxygen-consuming fuel cell contacts said second surface of said membrane.

19. The apparatus of claim 18 wherein said contained is formed in part from a pair of manifolds disposed to form opposite ends of said container and a plurality of gas permeable tubes connected in parallel between the opposed manifolds, the interior of said manifolds and said tubes forming the interior of said container.

* * * * *